Patented Dec. 11, 1928.

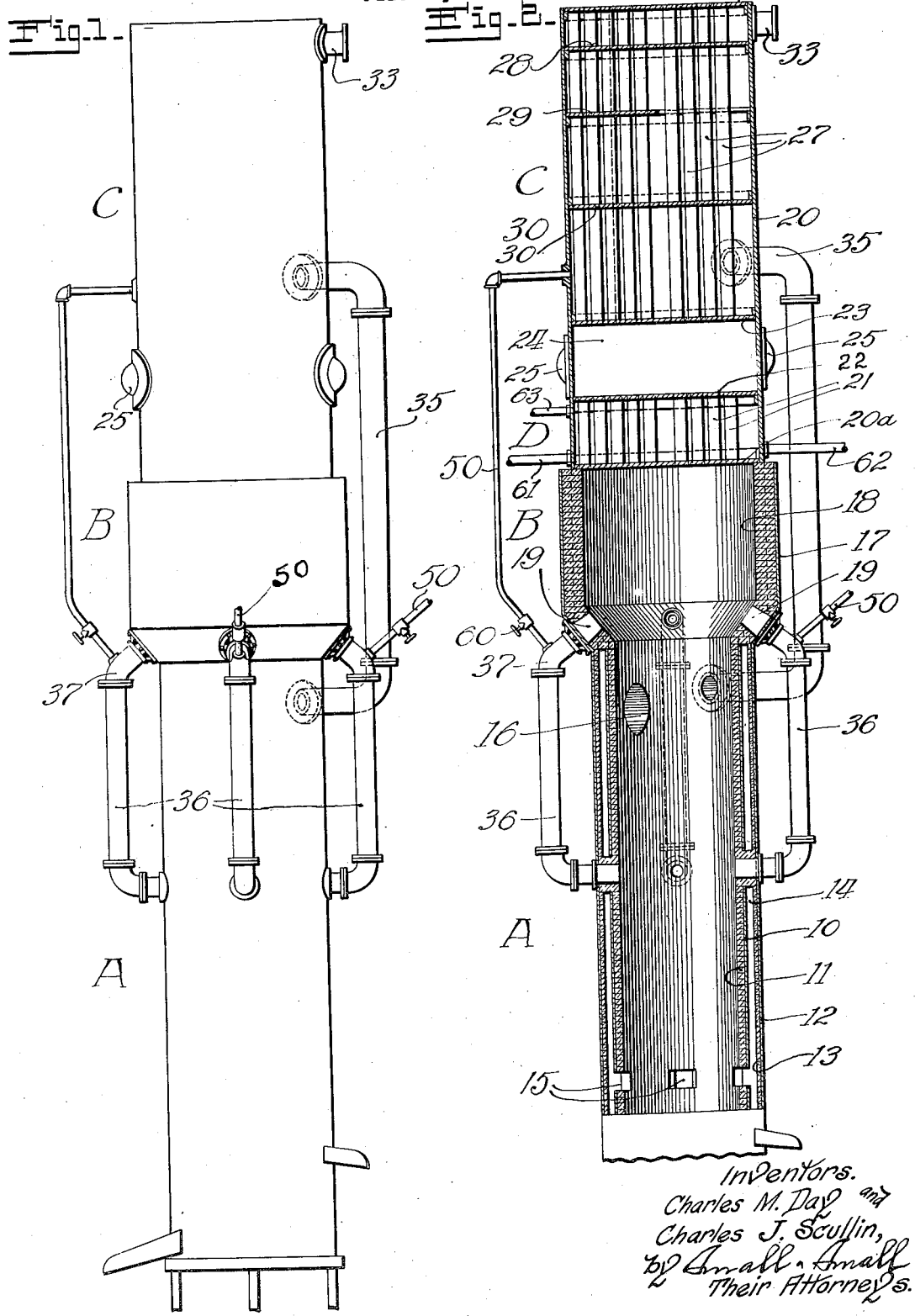

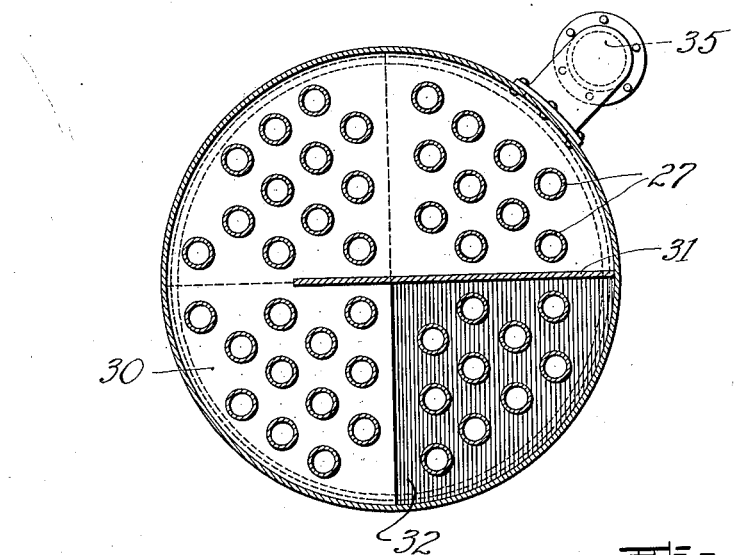
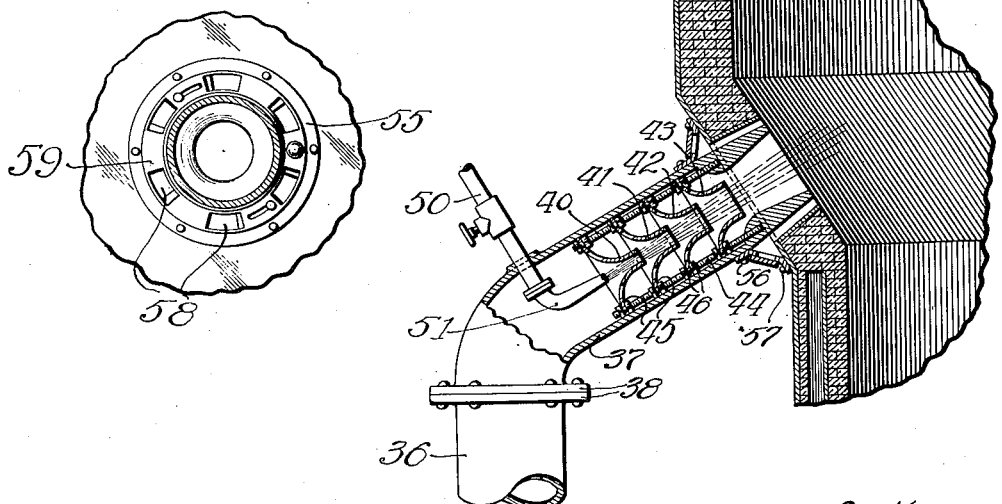

1,694,376

UNITED STATES PATENT OFFICE.

CHARLES M. DAY, OF KIRKWOOD, AND CHARLES J. SCULLIN, OF ST. LOUIS, MISSOURI.

FURNACE FOR REDUCTION OF IRON.

Application filed April 19, 1926. Serial No. 102,880.

This invention relates to improvements in furnaces for reduction of iron and it has for its object the provision of a furnace of this character which will be more efficient both in fuel and time required and which will produce a superior grade of iron.

It is well known that in the common type of cupola furnace using air at atmospheric temperatures, there is a great loss in efficiency due to imperfect combustion. For some time, it has been recognized that by utilizing part of this waste heat for preheating the air of combustion, increased efficiency could be secured.

The furnace of the present invention was designed to effect a material saving in fuel employed, a material saving in the time used to melt the iron, and also the production of a better grade of iron on account of the melting temperature being hotter.

The present furnace also greatly reduces the liability of oxidizing the metal on account of less fuel and consequently less air being employed. It is also designed to reduce flaming at the charging door and substantially eliminates chilling of the slag around the tuyères with the consequent obstruction of the air passages.

In the furnaces now commonly employed, the lost heat represents approximately sixty-five (65) per cent of the total heat values of the fuel used. This heat is lost mainly in three ways: The heat radiated through the side walls and bottom of the furnace amounts to roughly fifteen (15) per cent, the sensible heat of the waste gases is estimated at approximately fifteen (15) per cent; while the potential heat in the carbon monoxide (CO) of the waste gases involves approximately thirty-five (35) per cent. The above values are only approximate, but represent about the average losses in the present cupola furnaces which use air at atmospheric temperatures.

In the furnace of the present invention, the heat losses above referred to are greatly reduced in the following manner: The carbon monoxide is burned in the combustion chamber thus converting this potential heat into sensible heat. The products of the combustion of the carbon monoxide are passed through a recuperator and the heat extracted therefrom so far as possible. This heat is employed to preheat the air of combustion supplied to the fuel in the melting or charge chamber and also the air of combustion supplied to the combustion chamber in which the carbon monoxide gas burns.

The radiation of heat from the side walls of the furnace is largely prevented by providing between the inner and outer walls of the furnace an annular space through which the air of combustion passes before entering the charge chamber. Also, due to the fact that preheated air is supplied to the combustion chamber, the combustion in the charge chamber is made more complete.

It is believed the further disclosure of the invention will be most readily understood from a detailed description thereof, taken in connection with the accompanying drawings, in which:

Fig. 1 is a side view of the furnace of the present invention, but with the dome and outlet pipe at the top omitted;

Fig. 2 is a vertical sectional view through the furnace of Fig. 1, with the bottom and legs omitted;

Fig. 3 is a transverse sectional view through the recuperator of the furnace and shows one of the horizontal baffle plates employed;

Fig. 4 is a view of the air controlling damper or collar surrounding the intake pipe for the carbon monoxide (CO) gas, and Fig. 5 is a longitudinal sectional view through the pipe just referred to showing the gas burner and ejector structure in detail.

Reference will now be made to the drawings, in which like reference characters indicate the same parts in the several views: The present furnace comprises three main parts—the melting or charge chamber A in which the iron is melted, the combustion chamber B in which the combustible gases, as carbon monoxide, are burned and the recuperator C in which the heat is largely removed from the products of combustion.

The melting chamber A comprises an inner wall comprising an outer iron cylinder 10 and a lining 11 of refractory material, also an outer wall comprising the iron cylinder 12 within which is the lining 13 of refractory material. Between the inner and outer walls is the annular air space 14 which communicates with the interior of the charge chamber A through the tuyères 15. Extending through the outer and inner walls adjacent to the top of the chamber A is the charge opening 16 through which the iron and coke is supplied to the melting chamber.

The metal cylinder 12 of the outer wall adjacent to the top of the chamber A, extends outwardly and upwardly to provide the cylinder 17 within which is the lining 18 of refractory material. The lining 18 encloses the combustion chamber B, above referred to. Associated with the chamber B adjacent to the lower end thereof are a plurality of burners 19 which will be subsequently described. These burners may be of any desired number, four being disclosed in the present embodiment of the invention.

Extending upwardly from the chamber B is a metal cylinder 20 which forms an enclosure for the recuperator C and waste heat boiler D which will be subsequently described.

The combustion chamber is capped by a plate 20ª provided with openings which receive the ends of the pipes or flues 21, the upper ends of the pipes 21 being received by openings in the plate 22. Above the plate 22 and substantially parallel therewith is a plate 23. The plates 22 and 23 are spaced apart roughly about two feet and provide a man-hole or clean-out and inspection opening 24, access to which may be had through the doors 25.

The recuperator C is provided at the upper end thereof with a cap or cover plate 26 having openings to receive the upper ends of the pipes or flues 27, the lower ends of which are received by openings in the plate 23. Positioned between plates 23 and 26 are three horizontal baffles 28, 29, and 30. These baffles are so arranged vertically of the recuperator C that the upper space between plate 26 and baffle 28 is smaller than that between baffle 28 and baffle 29 and likewise each of the spaces provided by the baffles is larger than the space immediately above it; thus providing increased space for the air as it expends upon becoming heated. The recuperator C is also provided with a vertically extending baffle 31, (see Fig. 3), which extends from two-thirds (⅔) to three-quarters (¾) of the distance across the recuperator. Each of the baffles 28, 29, and 30 is cut away so as to provide a V-shaped opening 32, as shown in Fig. 3. This opening in the present form of the invention, is substantially a quadrant, but obviously may be made larger or smaller as found expedient. The baffles are provided with openings through which the pipes or flues 27 snugly pass and are arranged so that the openings 32 in alternate baffles are disposed on the opposite sides of the vertical baffle 31.

Communicating with the upper recuperator space, above baffle 28, is an intake pipe 33 with which a blower may be associated to force air into and through the recuperator. The air entering through pipe 33 will pass along one side of the vertical baffle 31 and back on the other; thence downwardly through the opening 32 in the baffle 28. As the opening in the next baffle 29 is on the opposite side of vertical baffle 31, the air must pass in a reverse direction around the edge of baffle 31 and downwardly through the opening in baffle 29; thence repeating the operation, the air passing in the reverse direction about baffle 31 and downwardly through the opening in baffle 30.

Communicating with the space in recuperator C below baffle 30 is one end of pipe 35, the opposite end of which extends through the outer wall 12, 13 of the charge chamber A and communicates with the annular space 14 adjacent to the upper end thereof.

Communicating with the chamber A at about the vertical center thereof are the lower ends of the pipes 36, the upper ends of which communicate with the combustion chamber B through the medium of pipes or tubes 37 joined to pipes 36 by flanges 38. These pipes 37 terminate in the burners 19 previously referred to. Within each pipe 37 is a series of spaced funnel like members 40, 41, 42 and 43 arranged in concentric relation. As seen in Fig. 5, these funnel members are of increasing sizes and are supported by the threaded members or bolts 44 which pass through openings or slots in the arms 45 extending laterally from the funnel members, the nuts 46 being provided to hold the parts in fixed relation. As the funnel members 40, 41, 42 and 43 are carried by the radially extending arms, there is left a space for the passage of air or gas outside of the funnel members.

A pipe 50 communicates at its upper end with the lowermost section of recuperator C and at its lower end extends into the pipe section 37. Fixed to the lower end of pipe 50 is a nozzle 51 directed into the outermost funnel 40. As the air in recuperator C is under a pressure of, say 10 to 16 ounces, due to the blower associated with the intake pipe 33, the hot air from the generator escapes through the nozzle 51 and through the successive funnels 40, 41, 42 and 43 setting up an ejector action which tends to create a vacuum in the pipe 36. This operation acts to withdraw the gases from the melting chamber A and force them into the combustion chamber B along with the hot air entering through pipe 50.

Surrounding each pipe section 37 is a collar or flange 55, one edge of which is secured to pipe 37 by means or rivets 56, the other edge being secured to the furnace shell by means of rivets 57. This collar 55 acts to brace the pipe 37 and burner 19 and retain them in position. Each collar 55 is provided with a plurality of openings 58 which are arranged to be controlled through the medium of the annular member 59 in a manner similar to that of the well known "Bunsen burner". The pipes 50 are provided with valves or cut-offs 60 for controlling the flow of air to the ejector nozzle 51.

Immediately above combustion chamber C, between plates 20ᵃ and 22 is the waste heat boiler D, the principal purpose of which is to reduce the temperature of the products of combustion to about 2,000 degrees or 2100 degrees fahrenheit so as to insure against burning and warping the flues of the recuperator C.

Extending into boiler D are the pipes 61 and 62 through which water is circulated. Also communicating with the boiler D is a pipe 63 which permits of the escape of the steam generated in the boiler. This steam may be used to drive the blower associated with pipe 33, exhausted into the pipe or chimney above the recuperator to increase the draught, or it may be employed for any other desired purpose.

The operation of the present furnace is as follows: A charge of coke and iron having been inserted in chamber A through the charge opening 16 and ignited, the products of combustion pass upwardly through the combustion chamber B and the flues of recuperator C. The blower associated with pipe 33 being in action, air is circulated through the recuperator C and passes downwardly through pipe 35 into the upper end of the annular chamber 14 surrounding the charge chamber A; thence downwardly in the annular chamber and through the tuyères 15 into the charge chamber. The air under pressure also passes through the pipes 50 and nozzles 51 setting up an ejector action in the pipe sections 37. This ejector action operates to draw the waste gases of combustion from the chamber A and force them together with the hot air entering through pipe 50, into the combustion chamber B where the carbon monoxide and smaller quantities of certain other gases are burned The products of the combustion of the carbon monoxide in the chamber B pass upwardly through the waste-heat boiler and thence through the flues 27 of the recuperator C, thus heating the latter so that the air supplied through pipe 35 to the tuyères 15 and through pipes 50 to the burners 19 acts largely to absorb the sensible heat in the products of combustion.

The draft created in the pipes 36 by the ejector action, combined with the resistance the gases meet in going through the charge in chamber A above the intakes to pipes 36, cause a large portion of the gases to pass through the pipes 36 into combustion chamber B. This operation materially lessens the amount of gas passing the charging doors to be chilled by the admission of air at that point and also lessens the flaming at the charging door. The burners, if supplied with hot gas and properly regulated hot air, will burn steadily and will keep ignited that gas which passes the charging door and which might otherwise be chilled to the point of making a steady combustion uncertain.

The present furnace is far more efficient, not only from the standpoint of fuel required on account of the more perfect combustion but, due to the use of preheated air, higher temperatures are reached in the furnace; thus materially decreasing the time required. The higher temperatures also operate to produce a better grade of iron and as less fuel is used, the amount of sulphur picked up by the iron is reduced.

While in the drawings and the above description but a single set of details has been disclosed, it is to be understood that many modifications are contemplated in manner of carrying out the invention. The invention, therefore, should be limited only by the scope of the appended claims.

Having thus described our invention, what we claim as new and desire to secure by Letters Patent of the United States is:

1. In a furnace for the reduction of metal, a charge chamber, a combustion chamber, a conduit joining said charge chamber to said combustion chamber, a tubular member mounted in said conduit, a nozzle directed into said tubular member, a pipe terminating in said nozzle and means for forcing air through said pipe and nozzle to create an injector action in said conduit.

2. In a furnace for the reduction of metal, a charge chamber, a combustion chamber, a recuperator, a conduit joining said charge chamber to said combustion chamber, a tubular member mounted in said conduit, a nozzle directed into said tubular member, a pipe communicating at one end with said recuperator and terminating at its other end in said nozzle and means for creating a flow of air in said pipe from said recuperator into said conduit.

3. In a furnace for the reduction of metal, a charge chamber, a combustion chamber, a recuperator, a conduit joining said charge chamber to said combustion chamber, a tapered tubular member mounted substantially centrally in said conduit, a nozzle directed into said tubular member, a pipe communicating at one end with said recuperator and terminating at its other end in said nozzle and means for forcing air into said recuperator whereby air passes from said recuperator through said pipe and into said conduit.

4. In a furnace for the reduction of metal, a charge chamber, a combustion chamber, a recuperator, a conduit joining said charge chamber to said combustion chamber, a series of spaced tubular members of increasing diameters mounted in said conduit, a nozzle directed into the outermost one of said tubular members, a pipe communicating at one end with said recuperator and terminating at its other end in said nozzle and means for creating a flow of air in said pipe from said recuperator into said conduit.

5. In a furnace for the reduction of metal, a charge chamber, a combustion chamber, a recuperator, a conduit joining said charge chamber to said combustion chamber, a series of spaced tubular members of increasing diameters mounted in said conduit, a nozzle directed into the outermost one of said tubular members, a pipe communicating at one end with said recuperator and terminating at its other end in said nozzle and means for forcing air into said recuperator whereby air passes through said pipe and nozzle into said conduit.

In testimony whereof we have signed this specification.

CHARLES M. DAY.
CHAS. J. SCULLIN.